(12) United States Patent
Ochiai et al.

(10) Patent No.: US 8,152,131 B2
(45) Date of Patent: Apr. 10, 2012

(54) WAFER-SHAPED PILOT-TYPE VALVE

(75) Inventors: Masaru Ochiai, Komaki (JP); Katsumi Tsuchimoto, Komaki (JP)

(73) Assignee: Kane Kougyou Co., Ltd., Komaki-shi, Aichi-ken (JP)

( * ) Notice: Subject to any disclaimer, the term of this patent is extended or adjusted under 35 U.S.C. 154(b) by 934 days.

(21) Appl. No.: 11/880,927

(22) Filed: Jul. 25, 2007

(65) Prior Publication Data

US 2008/0078967 A1   Apr. 3, 2008

(30) Foreign Application Priority Data

Oct. 2, 2006   (JP) .................................. 2006-270216

(51) Int. Cl.
   *F16K 31/12*   (2006.01)
(52) U.S. Cl. .......................................... 251/29; 251/151
(58) Field of Classification Search .................... 251/29, 251/28, 61, 61.2, 61.5, 148, 151
   See application file for complete search history.

(56) References Cited

U.S. PATENT DOCUMENTS

| | | | |
|---|---|---|---|
| 508,133 A | 11/1893 | Gold | |
| 2,373,654 A * | 4/1945 | Beekley et al. | ................. 251/86 |
| 3,001,550 A | 9/1961 | Engel et al. | |
| 3,218,024 A | 11/1965 | Kroekel | |
| 3,338,140 A | 8/1967 | Sheesley | |
| 3,346,005 A | 10/1967 | Hanssen | |
| 3,451,431 A | 6/1969 | Royer | |
| 3,521,666 A | 7/1970 | Scaramucci | |
| 3,627,258 A * | 12/1971 | Scaramucci | .................. 251/152 |
| 3,672,632 A * | 6/1972 | Chow | ............................ 251/151 |
| 4,471,799 A | 9/1984 | Buck | |
| 2008/0078967 A1 | 4/2008 | Ochiai et al. | |

FOREIGN PATENT DOCUMENTS

| | | |
|---|---|---|
| JP | 03-156617 | 7/1991 |
| JP | 6-37446 | 9/1994 |

OTHER PUBLICATIONS

"Valve Terms JIS B 0100-1984", Japanese Standards Assoc., First Edition, Feb. 28, 1985, p. 37, No. 10307, p. 38, No. 10705.
U.S. Appl. No. 11/603,478, Applicant: Masaru Ochiai et al., filed Nov. 22, 2006 entitled Wafer-Type Direct-Acting Valve.

* cited by examiner

*Primary Examiner* — John Fristoe, Jr.
*Assistant Examiner* — Andrew J Rost
(74) *Attorney, Agent, or Firm* — Flynn, Thiel, Boutell & Tanis, P.C.

(57) ABSTRACT

In a pilot-type valve, a valve box enclosing a main valve is arranged in a state wherein same is sandwiched between pipe flanges tightened to one another with bolts. In the pilot-type valve, a pilot valve is used to control a driving force required to operate the main valve to open and close same. In addition, the valve box is flangeless at its connection end portions for connection with the pipe flanges and has an inlet and outlet for a pressurized fluid. A cover flange neck extended upward from the valve box is constricted only at sites on its walls corresponding to adjacent bolts extended between the pipe flanges, so that the cover flange neck can be passed through the interval between these bolts.

8 Claims, 5 Drawing Sheets

WAFER-SHAPED PILOT-TYPE VALVE

BACKGROUND OF THE INVENTION

1. Field of the Invention

The present invention relates to a wafer-shaped pilot-type valve. The valve is a pilot acting valve that uses a pilot valve to control the opening and closing of a main valve, for example, a pressure adjustment valve such as a pressure reducing valve, an electromagnetic valve, and a water level regulating valve. A valve box of the main valve is sandwiched between pipe flanges and is fixed to this state by the bolts passing through the pipe flanges.

2. Description of the Related Art

Conventionally, there are wafer-shaped valves such as a single plate check valve and a flangeless butterfly valve. In these wafer-shaped valves, a thin discoid valve body swings or rotates inside a thin cylindrical valve box through which the flow of the fluid is regulated linearly, so as to open and close a flow path. These valves are relatively simple in structure and operation (for example, see Japanese Industrial Standards Committee, "Valve Terms JIS B 0100-1984", Japanese Standards Association, First Edition on Feb. 28, 1985, p. 37, No. 10307, p. 38, No. 10705).

On the other hand, there are also pilot-type valves. The pilot-type valves are categorized into an inside pilot-type valve and an external pilot-type valve. The inside pilot-type valve includes a main valve and a pilot valve integrated into a one piece unit. The external pilot-type valve includes a pilot valve and a main valve as separated pieces from each other and connected with each other via a proper pipe path. In either type of valves, the valve box enclosing the main valve is formed with a flow path in the shape of the letter S extending from its inlet to its outlet which are designed to be suitable for fully closing the valve and regulating the flow rate. In addition, widely and generally employed pilot-type valves are in a so-called flanged type in which the connection end portions to be connected with the pipe members are flanged (for example, see Japanese Laid-Open Patent Publication No. 3-156617 (FIG. 1). However, there has been no pilot-type valve which is also wafer-shaped. The possible reason thereof is that the structure of the wafer-shaped pilot-type valve will not be as simple as the single plate check valve represented by the wafer-shaped valve described above.

A pilot-type valve requires a significantly large driving force to directly actuate the main valve by a spring and the like as is conducted in a direct acting valve. In many cases, a pilot-type valve includes a large-sized diaphragm and a large-sized piston and the like as the constituent elements of the driving portion for the main valve, and the capacities and pipe arrangement systems are also large. If the valve box enclosing the main valve has flanges as is the case described above, there arises a problem that not only the valve itself is heavy-weighted but also the manufacturing cost increases at least by the material cost for the flanges.

In view of the circumstances described above, an objective of the present invention is to provide a wafer-shaped pilot-type valve, in which the valve box enclosing the main valve is flangeless, and the valve box is sandwiched between the pipe flanges and is fixed to this state by tightening the pipe flanges to each other with bolts and nuts, so as to install the pipes.

SUMMARY OF THE INVENTION

To achieve the objective described above, in the present invention, a wafer-shaped pilot-type valve that uses a pilot-type valve to control a driving force required for actuating a main valve to open and close the main valve, includes: a valve box enclosing said main valve, said valve box sandwiched between pipe flanges tightened to each other with bolts and nuts, said valve box being flangeless at its connection end portions for connection with said pipe flanges and having an inlet and an outlet for a pressurized fluid respectively; and a cover flange neck extended upward from said valve box, said cover flange neck including a space for allowing passage of a pressurized fluid, said cover flange neck accommodating only a valve stem passed therethrough, said valve stem coupling said main valve with a driving portion for controlling the opening of said main valve in accordance with a variation in pressure fed from said pilot valve, wherein said cover flange neck is restricted only at sites on its side walls corresponding to said adjacent bolts into a width smaller than an interval between said bolts which will differ depending on a kind of said pipe flanges selected in accordance with a size of said valve so that said cover flange neck can be passed though the interval between said bolts extended between said pipe flanges and adjacent to each other on the circumferences of said pipe flanges.

In addition, a mating surface of each of said connection end portions to be mated with said pipe flanges may be recessed into an annular groove, and a sealing member may be fitted in said annular groove.

In summary, in the present invention, in the pilot-type valve, the valve box enclosing the main valve is sandwiched between the pipe flanges tightened to each other with the bolts and nuts. In addition, the connection end portions of the valve box to be connected with the pipe flanges and having an inlet and outlet for the pressurized fluid respectively are flangeless. As compared with a flanged valve, the total weight of the valve can be significantly reduced, and the inter-surface dimension (i.e. the dimension between the connection end portions) can be shortened, and the number of the bolts required for pipe installation can be reduced to half. In addition, the space for installing the valve box between the pipe members can be reduced, and the work required for pipe installation can be efficiently carried out. Further, the load applied to the pipe members in a completed pipe arrangement can be reduced, and the material costs required for the flanges can be eliminated and thus the manufacturing cost can be significantly reduced.

Further, the cover flange neck is extended upward from the valve box of the main valve, and includes in it a space for allowing the passage of a pressurized fluid. Then, only the valve stem connecting the main valve with the driving portion for controlling the opening of the main valve in accordance with the variation in the pressure fed from the pilot valve is passed through the space in the cover flange neck. To enable this cover flange neck to be passed through the interval between the bolts extended between the pipe flanges and adjacent to each other on the circumferences of the pipe flanges, the cover flange neck is restricted to form a restricted portion in a width smaller than the interval between the bolts which will differ depending on the kinds of the pipe flanges selected in accordance with the size of the valve. Specifically, the cover flange neck is restricted only at sites on the side walls corresponding to the adjacent bolts. When the valve is mounted in a sandwiched state between the pipe members having pipe flanges at their end portions, the restricted portion of the cover flange neck escapes the adjacent bolts extended between the pipe flanges. In this manner, the cover flange neck can pass through the interval between the adjacent bolts without obstructing the provision of the bolts. Thus, the bolts can be threaded through all the bolt holes of the pipe flanges without causing any problems. Then, by simply securing the bolts with nuts, the valve can be interposed between the pipe members without any difficulty.

According to the present invention even if the interval between the bolts differs depending on the kind of the pipe flanges standardized in accordance with the size of the valve and the interval is narrow, the bolts can be threaded through all the bolt holes of the pipe flanges without causing any problems. Then, by securing the bolts with nuts, the valve can be mounted between the pipe members without any difficulty. Even if the interval between the adjacent bolts for allowing the cover flange neck to pass therethrough is narrow and thus the cover flange neck is narrowed at sites corresponding to the bolts to form a restricted portion inside it, it is not required to narrow the cover flange neck in the direction along which the bolts are extended. Thus, the area for allowing the passage of the pressurized fluid which passes inside the cover flange neck at the site corresponding to the restricted portion can be sufficiently reserved without causing any trouble to the actuation of the main valve by the driving portion. As a result, the function as a pilot-type valve can be carried out more satisfactorily.

The mating surface of each connection end portion to be mated with each pipe flange is recessed into an annular groove, and a sealing member is fitted in the annular groove. At the time of pipe installation, by simply bringing the connection end portions into contact with the pipe flanges, the connection end portions and the pipe flanges are sealed with the sealing member interposed therebetween.

Therefore, according to the present invention, as described above, the connection end portions and the pipe flanges can be easily mated with each other into an air-tight state without requiring any labor. In a piping operation for a conventional wafer-shaped valve, in order to interpose a sealing member such as a gasket between the connection end portions and the pipe flanges, the sealing member has to be aligned in suspended state coaxially between the pipe flanges and the connection end portions having a diameter smaller than the pipe flanges, with supporting the valve so that the connection and portion of the valve should be coaxial with the pipe flange, to connect the connection end portions and the pipe flanges. This operation is very troublesome and requires much labor. The present invention has cancelled these troubles and significantly enhances the operation efficiency. Consequently, the practical effects of the present invention are enormous.

DETAILED DESCRIPTION

This valve is a pilot (acting) type valve that opens and closes its main valve 2 enclosed in a main body 1 by controlling a pilot valve 3 to increase and decrease a driving force (i.e. a pressure difference between a primary side-pressure and a secondary side-pressure) required to actuate the main valve 2. Specifically, the illustrated valve is a pilot-type pressure-reducing valve, whose main valve 2 enclosed in the main body 1 arranged in a main pipe operates using a pressure difference between the primary side-pressure and the secondary side-pressure as a driving force. A pressure-reducing valve with an opening small in diameter having a force balancing mechanism is used as a pilot valve 3. A pressure controlled through the pilot valve 3 is fed to a driving portion 4 of the main valve 2, so that the main valve 2 connected with the driving portion 4 opens and closes a flow path 5 included in the main body 1 and communicating with the main pipe.

The main body 1 includes a valve box 6 in which flow path 5 (i.e. a primary side-passage 5a and a secondary side-passage 5b) runs, and a driving portion 4 combined in the valve box 6 for controlling the opening of the main valve 2 in accordance with the variation in the pressure fed from the pilot valve 3. In the pipe arrangement of the main body 1, the valve box 6 is sandwiched between pipe flanges F, F1 provided at connection ends of pipe members P, P1 which are main pipes. Then, (long screw) bolts B, B1, which are threaded through the pipe flanges F, F1, are secured with nuts N, N1, so that the valve box 6 is interposed and supported between the pipe flanges F, F1.

The valve box 6 is formed with an inlet 7 and an outlet 8 at its left and right sides for allowing the entry and exit of a pressurized fluid therethrough. In addition, the valve box 6 includes in it the primary side-flow path 5a and the secondary side-flow path 5b respectively communicating with the inlet 7 and the outlet 8.

At the middle of the valve box 6, there is a partitioning wall 9 for partitioning the primary side-flow path 5a and the secondary side-flow path 5b into an upper portion and a lower portion. The partitioning wall 9 is formed with a main valve opening 10 for communicating the flow paths 5a, 5b with each other, and the flow path 5 extending from the inlet 7 and the outlet 8 is made to assume the S-like shape.

Further, the valve box 6 is flangeless at its connection end portions 11, 12 to be mated with the pipe flanges F, F1, formed with the inlet 7 and the outlet 8 of the flow path 5 individually, in such a manner that the valve box 6 is sandwiched between the pipe flanges F, F1. In this manner, the inter-surface dimension of the valve box 6 is set to be shorter than that of a conventional flanged valve box by the thicknesses of the flanges.

An annular groove 13 is formed into a recess on the mating surfaces of the connection end portions 11, 12 to be mated with the pipe flanges F, F1. A sealing member 14 such as an O-ring and a flat packing is fitted into the annular groove 13 (in the illustrated example, an O-ring is fitted).

From the upper portion of the valve box 6, a cover flange neck 18 extends upward. The cover flange neck 18 has a substantially round dish-like recessed portion 17 at its top end. The upper end portion of the recessed portion 17 is surrounded by a body covering flange 15 (i.e. a flange for connection with a later-described bonnet 16).

The cover flange neck 18 is mounted between the pipe flanges F, F1 with its connection end portions 11, 12 in contact with the pipe flanges F, F1 and bolts B, B1 threaded through the pipe flanges F, F1. The cover flange neck 18 is also capable of passing through an interval between the bolts B, B1 adjacent to each other on the circumferences of the pipe flanges F, F1 (in the illustrated example, the bolts B, B1 are adjacently threaded through the upper portions of the pipe flanges F, F1 and extended therebetween).

A bonnet 16 is substantially in the shape of an upside-down round dish. Its bottom opening end is surrounded by a flange 16a corresponding to the body covering flange 15.

The recessed portion 17 and the bonnet 16 are mated with each other via a diaphragm 19 and their respective flanges 15, 16a are tightened with bolts (some of them are eye bolts). The diaphragm 19 partitions the inner space created between the recessed portion 17 and the bonnet 16 into a lower space (i.e. a space inside the recessed portion 17) and an upper space (i.e. a space inside the bonnet 16).

An adjustment spring 20 is disposed inside the bonnet 16 and the space inside the bonnet 16 consists of a pressure room 21, so as to establish a driving portion 4.

The adjustment spring 20 consists of a compression coil spring which is interposed in a compressed state between a diaphragm press member 22, mated to the center on the upper surface of the diaphragm 19, and the center on the top end inside the bonnet 16.

The recessed portion 17 is opened to form an opening portion 23 in such a manner that it communicates with the primary side-flow path 5a via a space that allows the passage of the pressurized fluid residing in the cover flange neck 18, and also that the lower portion of the cover flange neck 18 corresponds to the main valve opening 10. The partitioning wall 9 stands up at its top end to correspond to the opening portion 23. The partitioning wall 9 partitions the primary side-flow path 5a and the communicating path (i.e. the space inside the cover flange neck 18) 24 continuous to the primary side-flow path 5a from the secondary side-flow path 5b.

Figure 1:
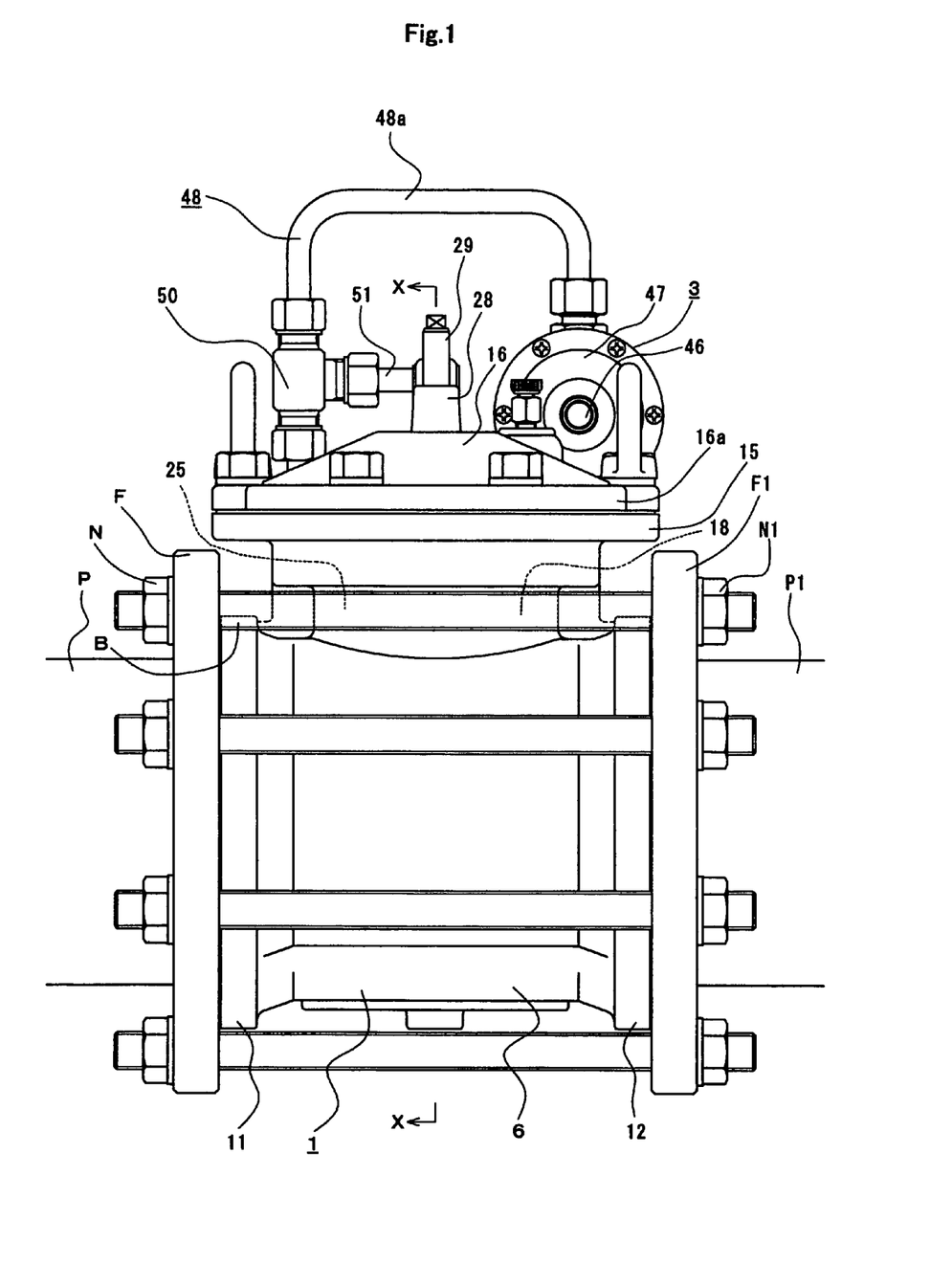
FIG. 1 is a front view showing a pipe arrangement of a wafer-shaped pilot-type valve.
Figure 2:
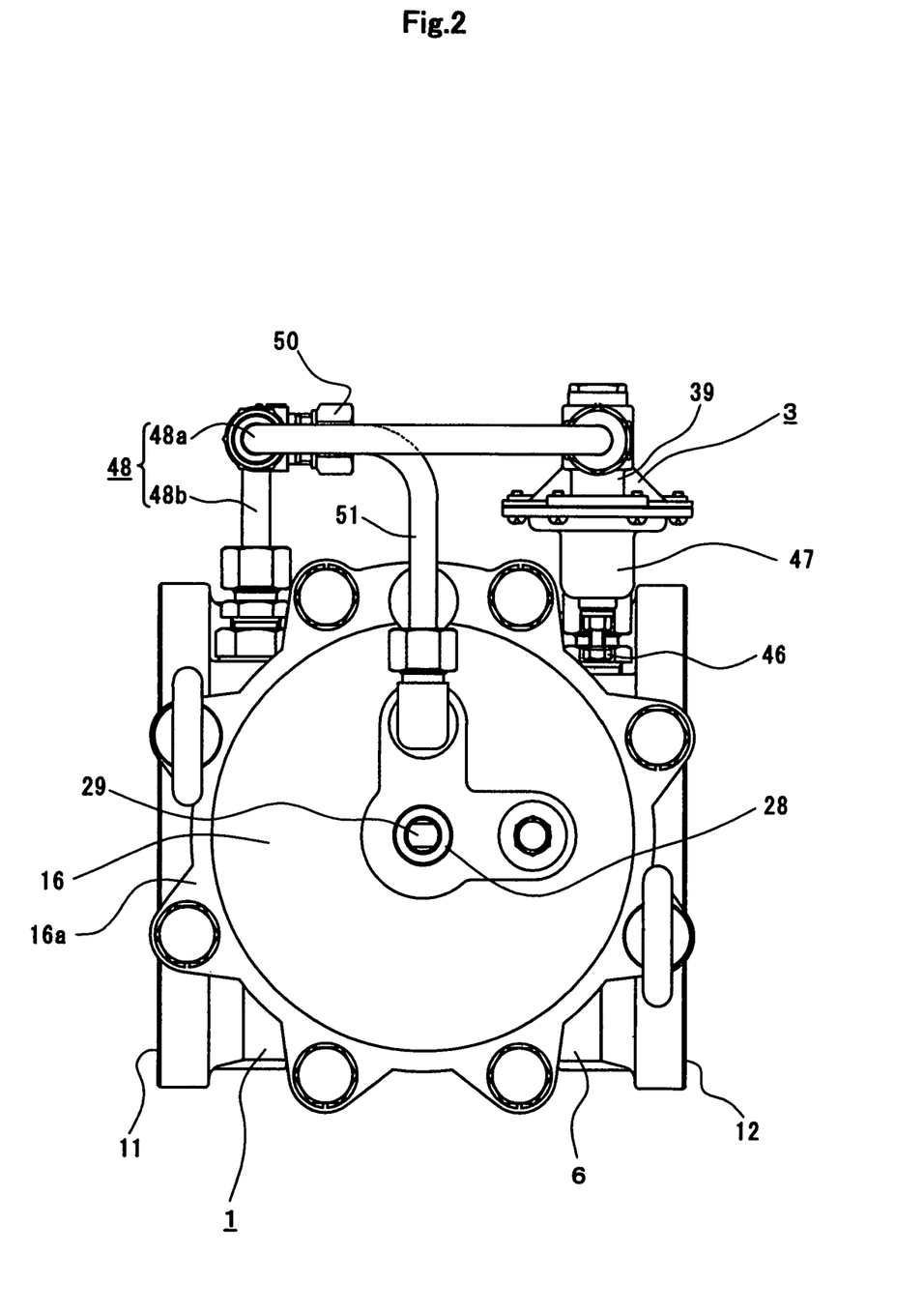
FIG. 2 is a plan view of the valve.
Figure 3:
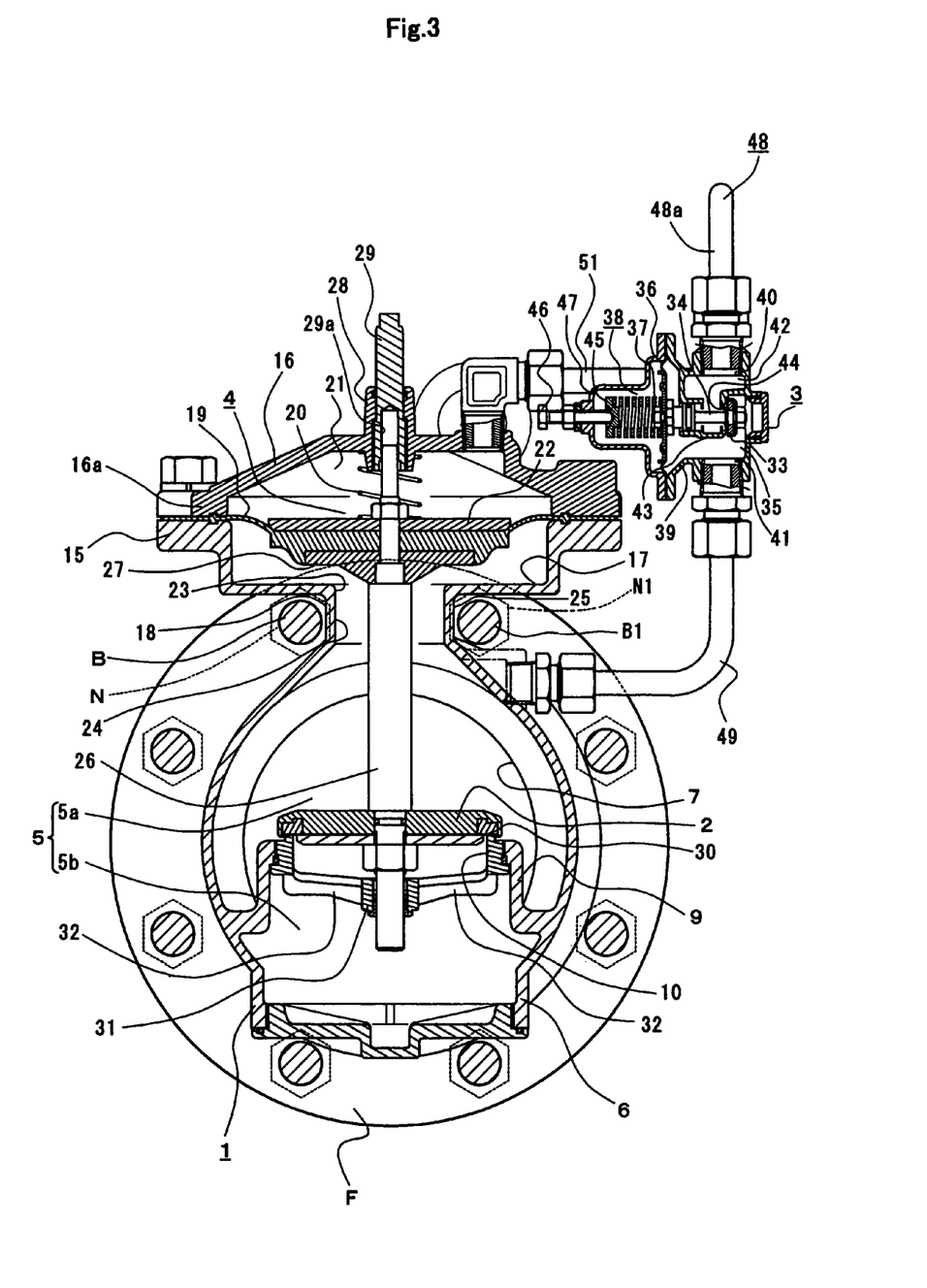
FIG. 3 is a cross-sectional view taken along a line X-X of FIG. 1.
Figure 5:
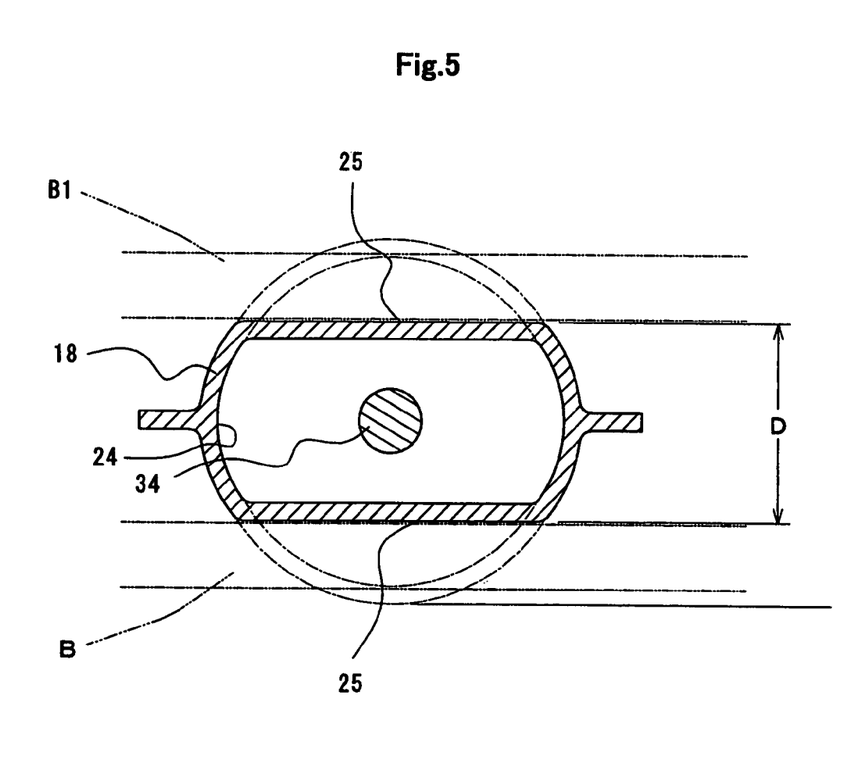
FIG. 5 is an enlarged cross-sectional end view taken along a line Y-Y of FIG. 4.

Normally, the communicating path 24 is formed into the shape of a cylinder as is shown by a single chain line in FIG. 5. Contrarily, in this embodiment, the communicating path 24 has a restricted portion 25 and has a rectangular cylindrical shape at the restricted portion 25 as shown in FIG. 5 for the following reason. As described above, the cover flange neck 18 is mounted between the bolts B, B1 adjacently threaded through the upper portions of the pipe flanges F, F1 with the valve box 6 arranged. To this end, as shown in FIG. 3, the cover flange neck 18 is restricted into substantially rectangular cylindrical shape at sites on its side walls corresponding to the bolts B, B1 adjacent to the communicating path 24 to form the restricted portion 25. In the formation of the restricted portion 25, the cover flange neck 18 is restricted at its side walls so that their interval becomes smaller than the interval between the bolts B, B1 which will differ depending on the kind of the pipe flanges F, F1 selected in accordance with the size of the valve. Thus, the communicating path 24 assumes a substantially rectangular cylindrical shape at the restricted portion 25 as shown in FIG. 5.

In this embodiment, the length of the cover flange neck 18 is merely slightly longer than the outer diameter of the bolts B, B1 as shown in FIG. 3. Thus, the outer width D (see FIG. 5) of the cover flange neck 18 corresponding to the width direction of the communicating path 24 (i.e. the direction perpendicular to the direction along which the bolts B, B1 are threaded) is reduced to be smaller than the interval between the bolts B, B1 over its entire height, so as to create the restricted portion. Contrarily, when the length of the cover flange neck 18 is significantly longer than the outer diameter of the bolts B, B1, it is desirable that the cover flange neck 18 is restricted only at sites on its side walls corresponding to the bolts B, B1, whereas the remaining sites on the side walls thereof not corresponding to the bolts B, B1 are left without being restricted as shown by the single chain line in FIG. 5. In this manner, the cover flange neck 18 at its restricted portion 25 can be reinforced.

Further, the communicating path 24 includes only a later-described valve stem 26 passed therethrough. There will be no trouble in the valve function as far as the pressurized fluid can still pass through the communicating path 24 at the restricted portion 25 even with the valve stem 26 passed through the communicating path 24. In any cases, however, since the pressurized fluid is throttled at the restricted portion 25, in order to achieve more excellent operability of the main valve 2 by the driving portion 4, it is desirable for the restricted portion 25 to have a larger area for allowing the passage of the pressurized fluid. To this end, it is more preferable that the restricted portion 25 is formed by restricting only the side walls of the cover flange neck 18 at the sites adjacently corresponding to the bolts B, B1 respectively.

The pipe flanges F, F1 selected are in conformity with the standards defined depending on the size of the valve. Therefore, the interval between the bolts B, B1 differs depending on the kind of the pipe flanges F, F1 used. Even if the interval between the bolts B, B1 is narrow and the communicating path 24 is restricted at its width direction accordingly to form the restricted portion 25, it is sufficient to restrict the cover flange neck 18 at sites on its sidewalls adjacently corresponding to the bolts B, B1. It is not needed to restrict or narrow the side walls of the cover flange neck 18 in the direction along which the bolts B, B1 are threaded. Therefore, the communicating path 24 can reserve a predetermined area for the passage of the pressurized fluid at its restricted portion 25 without causing any trouble to the control to the main valve 2 by the driving portion 4.

At the center of the lower surface of the diaphragm 19, a diaphragm receive member 27 is mated. The upper and lower portions of the diaphragm 19 is interposed between the diaphragm receive member 27 and the diaphragm press member 22. In this state, the valve stem 26 penetrates through these three members 19, 22, 27 at their center portions, so as to integrate these three members 19, 22, 27 and the valve stem 26 into a one piece unit.

Further, a supporting cylinder 28 having a diameter smaller than the adjustment spring 20 is protruded from the center of the top end of the bonnet 16 vertically inward and outward the bonnet 16. A flow rate adjustment bar 29, defining therein a guide hole 29a extending upward into a predetermined length from the bottom end of the bar 29, is screwed into the supporting cylinder 28 in an air-tight state. In this manner, the top end of the valve stem 26 is slidably inserted into the guide hole 29a of the flow rate adjustment bar 29.

The bottom end of the valve stem 26 penetrates through the main valve 2 for opening and closing the main valve opening 10 so as to fix the main valve 2. In this manner, the main valve 2 and the driving portion 4 are connected with each other via the valve stem 26.

The main valve 2 is detachably mounted on a valve seat 30 provided at an upward opening end of the main valve opening 10. The opening of the main valve 2 is controlled by the displacement of the diaphragm 19.

The bottom end of the valve stem 26 is slidably passed through a guide cylindrical portion 31 provided at a lower opening end of the main valve opening 10. The guide cylindrical portion 31 couples the top ends of a plurality of supporting arms 32 protruding radially around its outer periphery to the lower opening end of the main valve opening 10. In this manner, the clearance between the adjacent supporting arms 32 communicates with the main valve opening 10 so as to allow the passage of the pressurized fluid.

Then, the flow rate adjustment bar 29 is moved upward and downward to adjust the distance between the top end of the valve stem 26 and the clogged top end in the guide hole 29a. In this manner, the upper limit of the valve stem 26 is restricted, and the lift of the main valve 2, that is, the flow rate of the pressurized fluid is adjusted. It is also possible to move the flow rate adjustment bar 29 to bring the clogged top end of the upper portion in the guide hole 29a into contact with the top end of the valve stem 26, so that the main valve 2 is forced to fully close and the passage of water can be stopped at the primary side.

The pilot valve 3 is a direct acting pressure-reducing valve coupled to the valve body 33 via the valve stem 34. The pilot valve 3 includes a force balancing mechanism portion 38 consisting of a diaphragm 36 which displaces as the pressure in a secondary side-pressure room 35 varies and a pressure setting spring 37 for biasing the diaphragm 36 toward the direction along which the valve body 33 is opened.

A valve box 39 of the pilot valve 3 includes, at its left and right sides (i.e. at the upper and lower sides in FIG. 3), a primary side-pressure room 42 and a secondary side-pressure room 35 communicating with an inlet 40 and an outlet 41 for a pressurized fluid respectively and partitioned from each other by a partitioning wall 43. The partitioning wall 43 allows the primary side-pressure room 42 and the secondary side-pressure room 35 to communicate with each other via a valve opening 44 opened and closed by the valve body 33. A diaphragm 36 is interposed between the upper portion of a valve box 39 opened upward (i.e. the left side in FIG. 3) to communicate with the secondary side-pressure room 35, and a spring cover 47 screwed with an adjustment screw 46 that presses the pressure setting spring 37 toward a valve opening direction via a spring press member 45.

The pilot valve 3 is not limited to the structure described above, but may be in any other structures as far as it has a pressure-reducing function capable of keeping the secondary side-pressure at a certain constant pressure lower than the primary side-pressure.

Then, the inlet 40 of the pilot valve 3 is connected to the primary side-flow path 5a of the main body 1 via a first pipe path 48, whereas the outlet 41 of the pilot valve 3 is connected to the secondary side-flow path 5b of the main body 1 via a second pipe path 49.

The first pipe path 48 branches at some midpoint to lead to the pressure room 21. At the branching portion, a T-like pipe coupling member 50 having three-way connection openings is provided.

Figure 4:
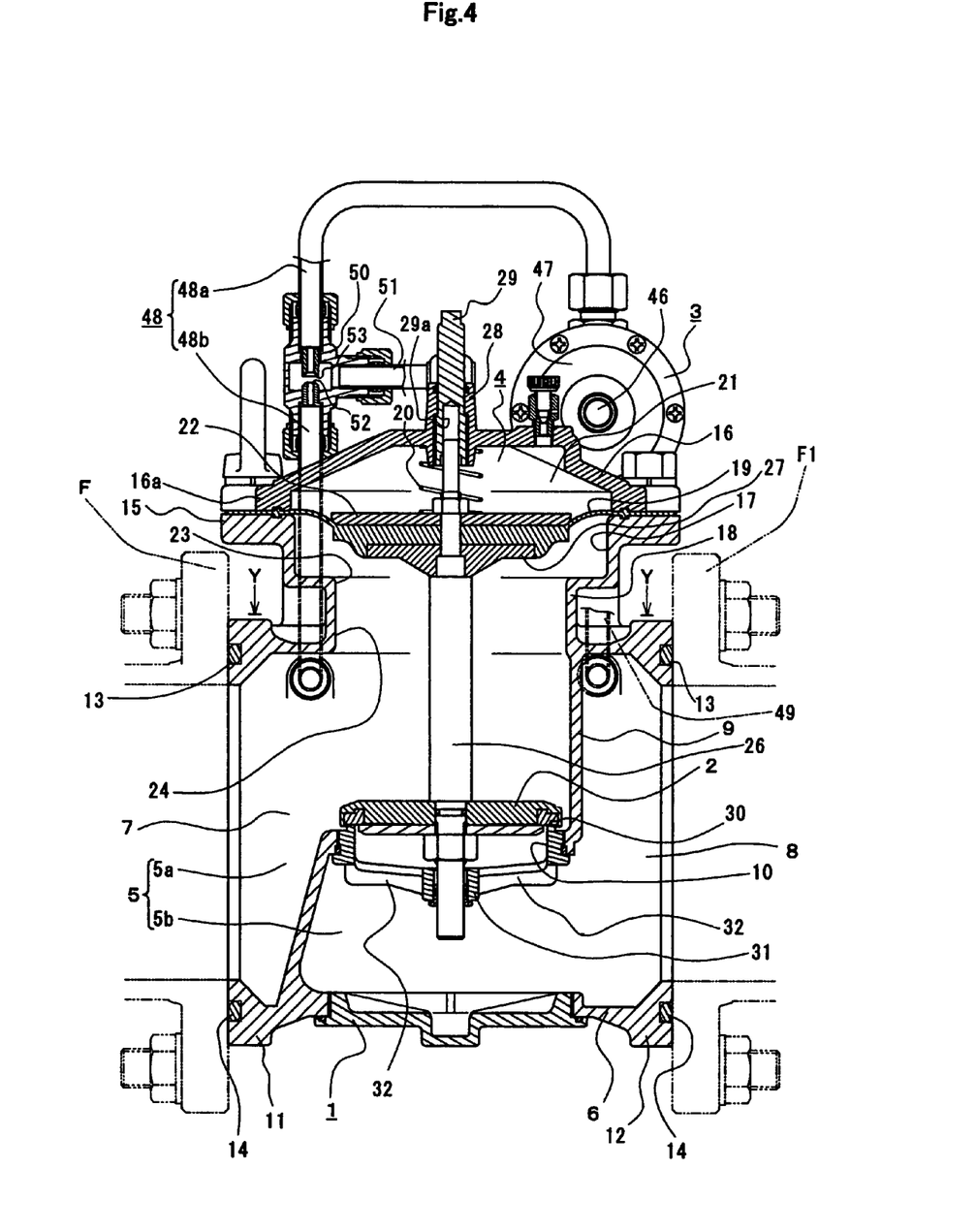
FIG. 4 is a longitudinal cross-sectional view of the valve.

In the pipe coupling member 50, the upper connection opening and the lower connection opening opened coaxially are respectively connected with a coupling pipe 48a for coupling with the pilot valve 3 (hereinafter, referred to as a pilot coupling pipe 48a) and a coupling pipe 48b for coupling with the primary side-flow path 5a (hereinafter, referred to as a primary side-coupling pipe 48b). The side connection opening perpendicular to the upper and lower connection openings is connected with a coupling pipe 51 for coupling with the pressure room 21 (hereinafter, referred to as a branch pipe 51) (see FIG. 4).

The outlet of the primary side-coupling pipe 48b and the inlet of the pilot coupling pipe 48a, opposed to each other within the pipe coupling member 50, are respectively formed with a flow-out throttle opening 52 and a flow-in throttle opening 53 having diameters smaller than the coupling pipes 48a, 48b. The flow-out throttle opening 52 and the flow-in throttle opening 53 adjust the flow rate of the pressurized fluid flowing through the pilot coupling pipe 48a and the branched pipe 51 respectively into the pilot valve 3 and the pressure room 21, so as to prevent a sharp variation in the pressure within the primary side-pressure room 42 of the pilot valve 3 and within the pressure room 21.

To mount the wafer-shaped pilot-type valve structured as described above, the connection end portions 11, 12 of the valve box 6 are respectively mated with the pipe flanges F, F1 formed in the pipe members P, P1. Then, the bolts B, B1 are respectively threaded through the bolt holes of the pipe flanges F, F1.

With the bolts B, B1 adjacently threaded through the upper portions of the pipe flanges F, F1, the cover flange neck 18 is passed through the interval between the bolts B, B1. Here, the cover flange neck 18 is formed with the restricted portion 25 adjacently corresponding to the bolts B, B1, and thus, the cover flange neck 18 is passed through the interval between the bolts B, B1 at this restricted portion 25 without obstructing the provision of the bolts B, B1. Then, a number of bolts B, B1, . . . arranged along the circumference of the individual pipe flanges F, F1 are uniformly secured with nuts N, N1, . . . so that the valve is interposed and fixed between the pipe members P, P1.

As a result of securing the bolts B, B1, . . . with the nuts N, N1, . . . the sealing member 14 inside the annular groove 13 formed in the respective connection end portions 11, 12 elastically deforms and tightly attaches to the connection end surface of the respective pipe flanges F, F1 to be mated with the connection end portions 11, 12, respectively. As a result, the connection end portions 11, 12 and the pipe flanges F, F1 are tightly adhered to each other respectively.

In thus-arranged valve, the pilot valve 3 controls the pressure fed into the pressure room 21 of the main body 1. That is, the pilot valve 3 increases the pressure inside the pressure room 21 to exert the force of the adjustment spring 20 that assists in closing the valve and the downward force to the diaphragm 19 in the valve closing direction. Contrarily, the pilot valve 3 decreases the pressure inside the pressure room 21 to exert the upward force by the primary-side pressure to the diaphragm 19 in the valve opening direction. These downward force and upward force exerted to the diaphragm 19 are balanced to control the opening of the main valve 2 in such a manner as to keep the secondary side-pressure at a certain constant pressure lower than the primary side-pressure.

In this embodiment, the wafer-shaped pilot-type valve is exemplified as a pilot-type pressure-reducing valve in which the pilot valve 3 consisting of a direct acting pressure-reducing valve having an opening with a small diameter is connected to the main body 1. However, the wafer-shaped pilot-type valve is not limited to the pilot-type pressure reducing valve, and may alternatively be other types of pilot-type valves such as a pilot-type pressure adjusting valve (i.e. a back pressure valve, a differential pressure valve, and the like), a pilot-type electromagnetic valve, a pilot-type water level regulating valve, and the like. In these alternative examples, as is the case described above, the connection end portions 11, 12 of the vale box 6 of the main body 1 are made to be flangeless, and the cover flange neck 18 extended upward from the valve box 6 is formed with the restricted portion 25. The cover flange neck 18, at its site formed with the restricted portion 25, can pass through the interval between the bolts B, B1 adjacent to each other and threaded through the upper portions of the pipe flanges F, F1.

In this embodiment, the pilot valve 3 and the main body 1 are separated from each other. Alternatively, the pilot valve 3 and the main body 1 may be in an integrated one piece unit as is the case of the pilot-type valve described in the Patent Document 1, as far as the integral structure is applicable to the present invention. In this alternative example, as is the case described above, the cover flange neck of the valve box enclosing the main valve is formed with the restricted portion.

What is claimed is:

1. A wafer-shaped pilot-type valve that uses a pilot valve to control a driving force required for actuating a main valve to open and close the main valve, comprising: a valve box enclosing said main valve, said valve box being sandwiched between pipe flanges tightened to each other with bolts and nuts, a pair of said bolts being disposed in adjacent but circumferentially spaced-apart relationship with one another to define an interval therebetween, said valve box being flangeless at its connection end portions for connection with said pipe flanges and having an inlet and an outlet for a pressurized fluid; and a cover flange neck extended upward from said valve box, said cover flange neck defining a space for allowing passage of a pressurized fluid therethrough and only a valve stem passes through said space along with the pressurized fluid, said valve stem coupling said main valve with a driving portion for controlling the opening of said main valve in accordance with a variation in pressure fed from said pilot valve, wherein said cover flange neck has side walls and is constricted only at sites on the respective side walls disposed immediately adjacent said bolts of said pair of bolts so as to have a first width smaller than the interval between said bolts which interval will differ depending on a kind of said pipe flanges selected in accordance with a size of said valve so that said cover flange neck can be passed through the interval between said bolts of said pair of bolts extended between said pipe flanges and located adjacent to each other along circumferences of said pipe flanges, said cover flange neck having a second width defined in a direction parallel to a direction in which said bolts extend between the pipe flanges, the second width being greater than the first width.

2. A wafer-shaped pilot-type valve according to claim 1, wherein a mating surface of each of said connection end portions to be mated with said pipe flanges is recessed into an annular groove, and a sealing member is fitted in said annular groove.

3. A wafer-shaped pilot-type valve according to claim 1, wherein said side walls are spaced from said valve stem to permit passage of the pressurized fluid through said cover flange neck within said space.

4. A wafer-shaped pilot-type valve according to claim 1, wherein the respective said side walls of said cover flange neck at said sites disposed immediately adjacent said bolts are spaced outwardly from said valve stem in directions transverse to a direction in which said bolts extend between said pipe flanges to permit passage of the pressurized fluid through said cover flange neck within said space.

5. A wafer-shaped pilot-type valve comprising:
  a main valve;
  a pilot valve for controlling a driving force required to actuate said main valve to open and close said main valve;
  a valve box enclosing said main valve, said valve box having end portions sandwiched between a pair of pipe flanges interconnected to one another with a plurality of bolts which extend between the pipe flanges, an adjacent pair of the bolts being disposed in circumferentially spaced-apart relationship with one another to define a bolt interval therebetween, said valve box including an inlet and an outlet for respectively allowing entry and exit of a pressurized fluid;
  a cover flange neck extending upwardly from said valve box and configured for positioning between the adjacent pair of bolts, said cover flange neck defining a space therein for allowing passage of the pressurized fluid through said cover flange neck, said cover flange neck having side walls, each said side wall having a portion which is constricted only at an area thereof disposed immediately adjacent a bolt of the adjacent pair of bolts such that said cover flange neck has a first width defined between said side walls in a direction transverse to a direction in which the bolts extend between the pipe flanges which is less than the bolt interval, said cover flange neck having a second width defined in a direction parallel to a direction in which the bolts extend between the pipe flanges, the second width being greater than the first width; and
  a valve stem extending through the space in said cover flange neck and coupling said main valve with a driving portion for controlling the opening of said main valve in accordance with a variation in pressure fed from said pilot valve.

6. A wafer-shaped pilot-type valve according to claim 5, wherein said side walls are spaced from said valve stem to permit passage of the pressurized fluid through said cover flange neck within said space.

7. A wafer-shaped pilot-type valve according to claim 5, wherein the respective said portions of said side walls of said cover flange neck are spaced outwardly from said valve stem in directions transverse to the direction in which the bolts extend between the pipe flanges to permit passage of the pressurized fluid through said cover flange neck within said space.

8. A wafer-shaped pilot-type valve according to claim 5, wherein said valve stem is the only structure disposed within the space of said cover flange neck, said side walls being spaced outwardly from said valve stem to permit passage of the pressurized fluid through said space of said cover flange neck.

* * * * *